United States Patent Office 3,293,674
Patented Dec. 27, 1966

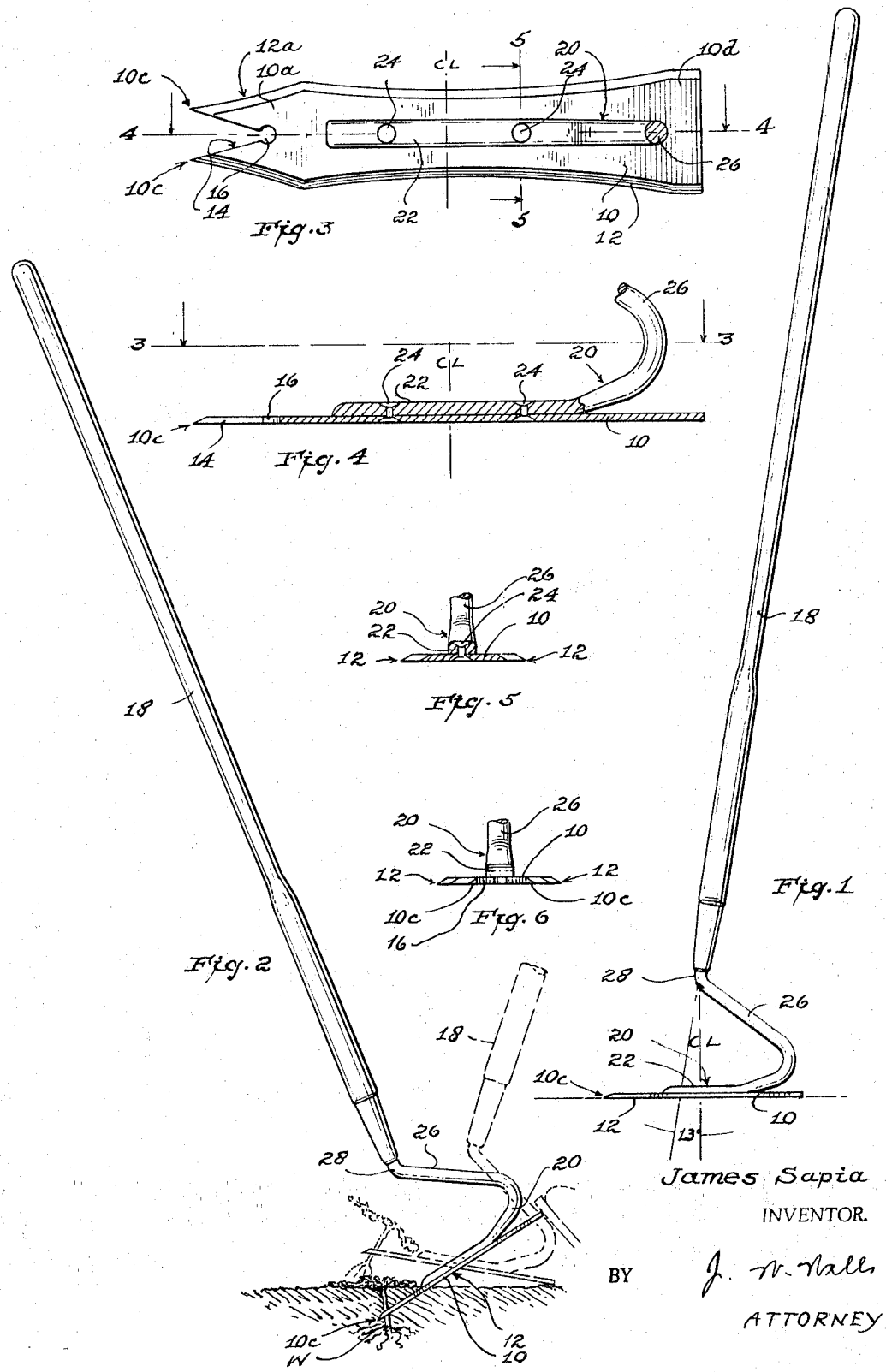

3,293,674
COMBINATION SICKLE AND WEED
PULLING TOOL
James Sapia, 1070 Terrace Blvd., Trenton, N.J. 08618
Filed Apr. 2, 1965, Ser. No. 444,978
5 Claims. (Cl. 7—14.1)

This invention relates to tools for cutting and pulling weeds and the like, and one of the principal objects of the invention is to provide a combination sickle and weed pulling tool embodying an efficient blade for cutting weeds, grass or the like with means in the end of the blade for pulling weeds from the ground, and operated by means of a single convenient handle.

Although I am aware that various types of sickles and also various types of weed pulling tools have heretofore been devised, as far as I am aware such tools have generally been designed for only a single purpose, that is, either solely for cutting weeds, grass or the like or for pulling weeds, thus rendering it necessary for a gardener or lawn caretaker to be equipped with two separate tools for alternately accomplishing both purposes.

For example, while most of the weeds in an area may be of such height as to render them easily cut with a conventional sickle others are spread out so closely to the surface of the ground as to render it impossible to insert a sickle blade under their leaves, and thereby necessitating that they be pulled from the ground.

My combination sickle and weed pulling tool consists of a single blade having longitudinal cutting edges for cutting upstanding weeds, and a forwardly tapered end divided into two pointed prongs by a V-shaped slot for engagement in said slot of the stem of a flat spreading weed, this blade being attached to an elongated handle by means of a gooseneck type of connection return bent near the rearward end of the blade and extending at an upward angle to a point above the center of the blade and inserted axially into the handle at such a height from the ground that the handle and upper portion of the gooseneck connection will either clear the tops of the weeds or contact them near their tops where they will easily bend and not materially interfere with the cutting stroke of the sickle blade. The cutting edges also extend along the tapered portion of the blade to its outer end for cutting weeds or grass which may be near a tree or other obstruction.

The cutting edges of the sickle blade are slightly convergent toward the front end and are inwardly curved both along the main body of the blade and the tapered end portion, which has been found to provide a more effective cutting result than a straight edge, in that the curved formation tends to prevent the stem of a weed from sliding along the edge of the blade.

The arrangement of the elongated handle relative to the blade is at a slight rearward angle, approximately 13 degrees, which is sufficient to permit a cutting stroke to clear the feet of the user while standing without bending forward in the cutting operation. The point of connection of the upper end of the gooseneck fitting with the lower end of the handle is in approximate vertical alignment with the intersection of the major and minor axes of the sickle blade, so that the heavier portion of the blade lies rearwardly of the intersection, which increases the effectiveness of the cutting stroke.

By the use of double cutting edges on the sickle blade the tool will accommodate either a right- or left-handed user. The double cutting edges on the tapered end portion of the blade also have another advantage in that they sharpen the ends of the prongs of the V-shaped slot, thereby facilitating their entry into the ground.

Not only does the use of my combination sickle and weed pulling tool relieve the user from changing from one separate tool to another for alternate cutting and weed pulling operations, thereby greatly increasing the speed and ease of his work, but it also provides a single tool for both purposes at a substantially lower cost than that of two separate tools.

Other objects and advantages of my combination sickle and weed puller will be apparent or pointed out in the following specification, in which reference is directed to the accompanying drawing forming a part thereof and in which:

FIG. 1 is a side elevation of my combination sickle and weed pulling tool, shown in the position for cutting a weed or the like;

FIG. 2 is the same as FIG. 1, but showing the tool in the position for pulling a weed from the ground;

FIG. 3 is a plan view of the sickle blade as viewed in a section taken on the line 3—3 of FIG. 4;

FIG. 4 is a longitudinal section of the sickle blade taken on the line 4—4 of FIG. 3;

FIG. 5 is a detail section taken on the line 5—5 of FIG. 3; and

FIG. 6 is an end view of the sickle blade as viewed from the front end.

Referring to the drawing in which like numerals designate like parts and details in the several views, my combination sickle and weed pulling tool includes a thin, flat and relatively narrow sickle blade 10 having its longitudinal edges downwardly beveled into sharp cutting edges 12. The front portion of the blade is forwardly tapered, as indicated at 10–a (FIG. 3), and the beveled sharp cutting edges continue along the tapered portion 10–a of the blade entirely to its terminal front end, which provides effective means for cutting weeds or grass growing close to a wall, tree or the like.

The tapered portion 10–a of the blade 10 is provided with a V-shaped slot 14 divergent longitudinally and rearwardly of the blade and terminating in a neck portion merging into a large opening 16 for the reception of the stem of a weed to be pulled from the ground. The slot 14 divides the tapered portion 10–a into two prongs 10–b having sharp ends 10–c formed by the bevels of the edges 12–a.

As shown in FIG. 3, the rearward end portion 10–d of the blade 10 is wider than the wider end of the tapered end portion 10–b so that the blade is in slight longitudinal convergence toward its front end. However, the longer cutting edges 12 and also the shorter cutting edges of the tapered portion 10–a are preferably inwardly curved, as shown in FIG. 3, which tends to prevent a weed or stalk of grass from sliding along the edge of the blade under impact of a cutting stroke, thereby increasing the cutting effectiveness of the blade.

An elongated straight handle 18 is attached to the top of the sickle blade 10 through a gooseneck type of connection indicated generally by the numeral 20, including a front straight portion 22 rigidly attached to the top of the blade in central longitudinal relation about midway between its ends by means of rivets 24 or other suitable means such, for example, as spot welding. The straight portion 22 extends rearwardly almost to the end of the blade where it is return bent into a forwardly extending, upwardly diverging portion 26 terminating at its upper end in a short rearwardly bent angular portion 28 at a point in approximate vertical alignment with the point of intersection of the major and minor axes of the blade 10, where it is inserted axially into the end of the handle 16.

The portion 28 is slightly bent toward the rear end of the blade 10 so that the handle 10 will be inclined rearwardly at such an angle that a cutting stroke of the blade will clear the feet of the user while standing in an upright position. I have found an adequate rearward angle of the handle to the blade to be approximately 13 degrees. However, the angle may be slightly greater or less without materially affecting the cutting action of the blade 10.

As shown in FIG. 1, the blade 10 is resting flatly on the ground in the correct position for a weed cutting stroke and with the handle 18 inclined rearwardly about 13 degrees, which will enable the user to grasp the upper portion of the handle and swing the blade 10 in front of his feet, and without bending forwardly. As already mentioned the rear end portion of the blade 10 is slightly wider than at the beginning of the tapered end portion so that the rearward position of the blade is heavier than the front end which, by reason of the connection at the lower end of the handle being in alignment with the center of the blade, throws the greater weight of the stroke rearwardly of the center and increases the effectiveness of a cutting stroke. The return bent portion 26 of the handle connection 20 extends almost to the rearward end of the blade 10, and its point of connection with the lower end of the handle 18 is of sufficient height above the blade that both the bent portion 26 and the lower end of the handle will swing clear of any weed being cut or contact it near its top where it will easily bend and not obstruct the cutting stroke.

As shown in FIG. 2, when a weed having its leaves closely flattened on the ground is encountered it can quickly be pulled from the ground by pressing the end of the blade into the ground by the user's foot, as shown in the broken lines, and pulling the handle rearwardly. The ground at the point of entry will serve as a fulcrum in loosening a weed from the ground and a slight further rearward movement of the handle will rock the blade on its rearward end and entirely lift the weed from the ground, as indicated in broken lines.

From the foregoing description it will be seen that I have provided a combination sickle and weed pulling tool by means of which the operations of cutting or pulling weeds or the like can be effectively accomplished by a single simple and economical tool which can be conveniently carried and used in such operations. Obviously, various changes or modifications of my combination sickle and weed pulling tool may be made within the spirit and scope of my invention. Therefore, it should be understood that the embodiment of my invention shown and described is intended to be illustrative only, and restricted only by the appended claims.

I claim:
1. A combination sickle and weed pulling tool comprising an elongated flat blade having a forwardly tapered end portion divided into two prongs by a central, rearwardly convergent, V-shaped slot, said blade having sharp longitudinal cutting edges extending along its entire length including that of said tapered portion, a gooseneck type of handle connection including an elongated straight portion rigidly attached to the top of said blade in central longitudinal relation therewith and extending rearwardly almost to the end of said blade where it is return bent into a forwardly extending, upwardly diverging portion terminating in a short rearwardly bent angular portion beginning at a point in approximate vertical alignment with the geometrical center of the blade; and an elongated handle attached to said angular portion of said connection in axial relation therewith.

2. A combination sickle and weed pulling tool as in claim 1 in which the rearward angle of the bent portion of the handle connection together with that of the handle is on the order of 13 degrees relative to the surface of said blade.

3. A combination sickle and weed pulling tool as in claim 1 in which the cutting edges of the blade are inwardly curved from a plane near the rear end of the blade to the rearward end of the tapered portion of the blade, and also inwardly curved along the entire edges of said tapered portion.

4. A combination sickle and weed pulling tool as in claim 1 in which the blade is in slight convergence toward its front end.

5. A combination sickle and weed pulling tool as in claim 1 in which the cutting edges of the blade are formed by downward beveling of the longitudinal marginal portions of said blade, which bring the terminal ends of the prongs of the tapered portion of the blade to sharp points.

References Cited by the Examiner
UNITED STATES PATENTS

| | | | |
|---|---|---|---|
| 1,068,346 | 7/1913 | Kilborn | 7—1 |
| 1,235,790 | 8/1917 | Gates | 30—318 |
| 2,151,577 | 3/1939 | Withington | 30—318 |
| 2,787,058 | 4/1957 | Vogel | 30—318 |
| 2,843,359 | 7/1958 | Franz et al. | 254—132 |

WILLIAM FELDMAN, *Primary Examiner.*

R. V. PARKER, *Assistant Examiner.*